INVENTORS
HARRY B. WATTSON
JOHN C. KARLSON
BY
Herbert J Smith
ATTORNEY

Feb. 23, 1960 H. B. WATTSON ET AL 2,925,662
COMPASS SYSTEM
Filed Feb. 10, 1955 2 Sheets-Sheet 2

INVENTORS
HARRY B. WATTSON
JOHN C. KARLSON
BY
Herbert Smith
ATTORNEY

United States Patent Office 2,925,662
Patented Feb. 23, 1960

2,925,662

COMPASS SYSTEM

Harry B. Wattson, Rutherford, N.J., and John C. Karlson, Brooklyn, N.Y., assignors to Bendix Aviation Corporation, Teterboro, N.J., a corporation of Delaware Application February 10, 1955, Serial No. 487,262

9 Claims. (Cl. 33—204)

This invention pertains generally to directional responsive devices and more particularly to an earth inductor compass system.

An earth inductor compass system, which has an application in aircraft, ships, and the like, comprises generally an element responsive to the earth's magnetic field, stabilizing devices to maintain the element in such a position that it will respond only to the horizontal component of the earth's magnetic field, a receiver responsive to the output of the compass element for developing further output when the receiver is not in a null position relative to the compass element output, and a motor responsive to the receiver output for driving the receiver to a null. In such systems, the output of the receiver is a relatively weak alternating current signal whose phase and amplitude correspond, respectively, to the direction and extent of the receiver from a null position relative to the field set up in the receiver by the output of the compass element. It is necessary that this receiver output be raised to a level sufficient to operate the motor and that the direction of deviation be determined from the phase of the signal.

Heretofore, the amplification and detection of the signal has been accomplished in an amplifier utilizing vacuum tubes and various filter networks. Therefore, the marginal life of the system has been dependent upon the life of the vacuum tubes, and it has been necessary to mount the amplifier on shock mounts so as to resist vibration and shock. Further, the demodulator and discriminator portions of the amplifier employed electron tubes and a complex circuitry which used a comparatively large amount of components which were expensive. Moreover, the fragility of the device, when subjected to shock, caused damage and required costly servicing, and necessitated delays in the use of the equipment.

An object of the present invention therefore is to provide a novel earth inductor system wherein no vacuum tubes are used.

A further object of the invention is to provide a novel earth inductor compass system wherein transistors are used to obtain the required signal level.

A further object of the invention is to provide an earth inductor compass system having an amplifier employing novel magnetic amplifier means having a discriminator portion so that the servo motor of the system thereof may be energized to drive an indicator to show the magnetic heading.

Another object of the invention is to provide a novel earth inductor compass system having an amplifier portion which utilizes a frequency doubler of a predetermined frequency to feed a bridge-type magnetic amplifier which utilizes a transistor amplifier portion carrying a signal of the same frequency as said predetermined frequency to provide an output for energizing the variable phase of an induction motor of the system to drive an indicator for showing the magnetic heading of the craft on which the earth inductor compass system is carried.

Another object is to provide an earth inductor compass system having a novel amplifier which is completely devoid of electron tubes, is efficient in operation, and yet is extremely robust.

The present invention contemplates an earth inductor compass system having an earth inductor with excitation and pickup windings thereon. The excitation windings are excited by a predetermined frequency and the output from the output winding corresponds to the magnetic heading. This output sets up a resultant magnetic field in the stator windings of a receiver inductive device whose rotor windings are connected through the novel amplifier of the present invention to the variable phase windings of a conventional induction motor. The output from the rotor winding of the receiver inductive device is a relatively weak alternating current and must be raised to a level sufficient to operate the motor to drive the rotor of the receiver to a new null position and to determine the direction, clockwise or counterclockwise, that the motor is to operate.

The novel amplifier of the present invention receives the output from the earth inductor, which output is twice the frequency of the frequency for energization of the excitation windings, and said frequency includes the signal derived from the earth's magnetic field. A multistage transistor amplifier amplifies the output from the earth inductor and this output is compared with the output from a frequency doubler energized by the source of excitation. The outputs from the frequency doubler and the earth inductor are compared in a bridge-type magnetic amplifier with the output of said bridge being connected to the variable phase of the induction motor which drives the receiver inductive device to null. The output from the induction motor is also used to actuate the indicator of the system.

The foregoing and other objects and advantages of the invention will appear more fully hereinafter from a consideration of the detailed description which follows, taken together with the accompanying drawings wherein one embodiment of the invention is illustrated in detail by way of example. It is to be expressly understood, however, that the drawings are for illustration purposes only and not to be construed as defining the limits of the invention.

Figure 1:
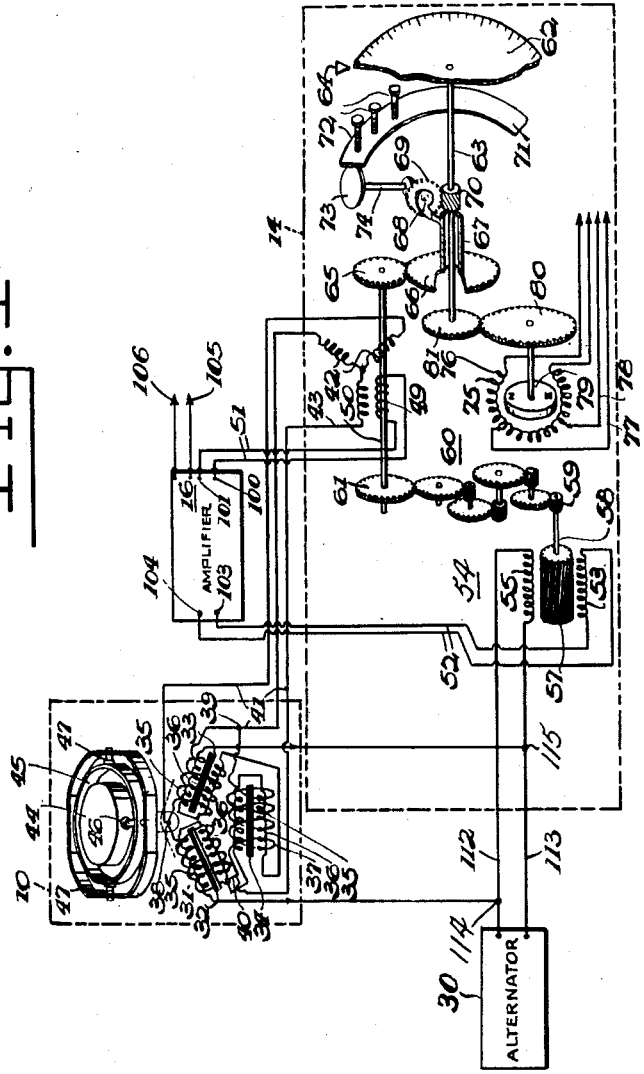
Fig. 1 is a schematic representation showing generally the arrangement of the various component parts of the present invention.

Turning now to the drawings and more particularly to Fig. 1 for a more detailed description of the present invention, the stabilized pickup unit within member 10 is shown as comprising a triangular element 31 having laminated legs 32, 33 and 34, each having wound thereon a pair of excitation windings 35, 36 connected in series opposed relation with a suitable source of alternating current such, for example, as alternator 30 and the magnetic fields induced by the current through each pair of windings 35, 36 are opposed. The secondary of element 31 comprises a delta connected coil 37 having three taps 38, 39 and 40 which connect by way of suitable leads 41 with the three wound phases of a stator 42 of an inductive coupling device 43 mounted within master indicator 14.

Each leg 32, 33, and 34 is saturated and desaturated twice for every cycle of the exciting current within primary windings 35, 36 whereby the flux threading each leg, due to the earth's magnetic field, is expelled from and re-enters each leg twice for each cycle of the exciting current. Since the primary windings 35, 36 of each leg are wound in series opposed relation, no effect is induced on secondary coil 37 by the exciting current itself. Except at the instant when the exciting current has attained a substantially maximum value, either positive or negative, the earth's magnetic field is free to traverse each leg and as a result voltages are induced at the three taps 38, 39 and 40 of secondary coil 37 differing and dependent in value on the direction in which the pickup element is positioned with reference to the earth's magnetic field.

The magnetic field pickup device, therefore, operates as an earth inductor compass in that for every deviation from a prescribed course, however minute, the induced voltages at the three taps of secondary 31 will vary in accordance with the deviation. For a more detailed description of the theory and operation of such pickup devices and the system, reference is made to U.S. Patent No. 2,261,309, issued November 4, 1941; U.S. Patent No. 2,308,566, issued January 19, 1943; U.S. Patent No. 2,313,682, issued March 9, 1943; and U.S. Patent No. 2,625,348, issued January 13, 1953, all being assigned to the assignee of the present invention.

In order to provide a compass in which turning and acceleration errors are, for all practical purposes, eliminated so that the tendency of the compass to oscillate or overswing is thereby prevented, element 31 of the pickup device is securely fastened to a rotor casing 44 of a three-degree-of-freedom gyroscope having an electrically driven rotor (not shown), provided with vertical spin axis, mounted with casing 44 which supports the rotor for oscillation about a first horizontal axis within a gimbal ring 45 by way of trunnions 46, the gimbal in turn being mounted for oscillating purposes about a second horizontal axis, perpendicular to trunnions 46, within a rigid support defined by member 10, by means of outer trunnions 47. A suitable erection device may be provided for maintaining the rotor spin axis normally vertical as well as a caging apparatus for caging and/or uncaging the gyro whenever desired.

For a condition of equilibrium, i.e., with the craft on course, the voltages within the three windings of stator 42 of coupling device 43 will correspond to the voltages at the three taps of secondary coil 37 of the pickup device. At the same time, a rotor winding 49 inductively coupled with stator 42 and carried by a shaft 50, suitably journalled within master indicator 14, will be disposed in an angular position with its electrical axis normal to the resultant of the magnetic field of the three windings of the stator so that the voltages in the stator windings have no inductive effect on the rotor winding. As soon, however, as the craft deviates from a prescribed course, the voltages at the three taps of secondary coil 37 will vary causing a variation in the voltages of each of the stator windings. Such change at the stator produces an angular change in the resultant of the magnetic field thereat and, since the electrical axis of the rotor winding is no longer normal to the resultant of the field at the stator, an error signal is induced within rotor winding 49 which is proportional to the angle of craft deviation from its prescribed course.

The electrical signal induced within the rotor winding is fed by means of suitable conductors 51 into amplifier 16 and out therefrom by means of leads 52 to one phase winding 53 of a two phase induction motor 54, the second phase winding 55 of which is continuously energized from alternator 30.

Upon energization of phase winding 53, a rotor 57 is actuated which carries a shaft 58 having a pinion 59 thereon meshing through a reduction gear system 60 with a driven gear 61 secured to rotor shaft 50 to drive rotor winding 49 to a null position, i.e., a position wherein the electrical axis of the rotor winding assumes a position normal to the new resultant of the stator field at which point the signal in winding 49 approaches zero and phase winding 53 of motor 54 is de-energized and the motor stops.

In order to provide an indication of the new position or the amount of deviation off course, an indicating dial 62 is provided which is carried by a shaft 63, journalled within master indicator 14, the dial being adapted for angular motion relative to a fixed index 64. Angular motion is imparted to the dial from rotor shaft 50 by way of a gear 65 fastened to the shaft and a gear 66 meshing therewith and having a hollow shaft 67 formed therewith and sleeved about dial shaft 63. An arm 68 is carried by hollow shaft 67 and supports thereon the shaft of a worm gear 69 which meshes with a worm 70, fastened to or formed integrally with shaft 63. Worm gear 69 normally meshes with worm 70 so that angular motion of shaft 50 imparts the same motion to shaft 63 and its dial 62. The threads on worm 70 and worm gear 69 are in the form of a spiral; so that motion may be imparted by worm gear 69 to worm 70.

Because of the iron masses, etc., present aboard a craft, the apparatus thus far described would indicate an apparent rather than a true magnetic heading. To compensate for this error an annular resilient element 71 is provided having spaced thereon approximately every ten or fifteen degrees, screws 72 which upon individual adjustment will define a variable cam track adapted to take into consideration the distortion of the earths magnetic field as a result of the craft's metallic masses for a 360° swing of the craft. After a ship's swing is taken, the result of the adjustment of screws 72 will be that resilient element 71 will have been depressed inwardly at some points and outwardly at other points. A follower 73 is provided for engagement with element 71 and is supported by an arm 74 fastened rigidly to the worm gear 69. Motion of dial 62 resulting from only the angular motion of rotor shaft 50 would result in an indication of an apparent heading. At the same time, however, that worm 70 is moved, follower 73 is swung angularly along element 71 to pass into a depressed portion thereof, for example, and worm gear 69 is rocked in a clockwise direction which causes an additional rotation of shaft 63 whereby dial 62 is moved to indicate true rather than apparent heading. Obviously, if the follower element 73 engages an outwardly projecting portion of the cam element 71, worm gear 69 will be rocked in a counter-clockwise direction to subtract from the total amount of angular motion imparted to shaft 63 and dial 62 by rotor shaft 50. The theory and operation of the foregoing compensating means is more fully described in the aforementioned U.S. Patent No. 2,308,566 and Patent No. 2,625,348.

As pointed out above, the ultimate output of shaft 63 is corrected for deviation error and, if desired, the indication of heading may be repeated at one or more remote stations through an electromagnetic device 75 comprising a stator having a single winding 76 provided with input leads from alternator 30, for example, and two output leads 77, 78 together with a magnet rotor 79 inductively coupled with the stator and having a shaft provided with a gear 80 thereon for meshing with a gear 81 splined to the free end of shaft 63. Motion of shaft 63 is thus reproduced at remote stations by movement of rotor magnet 79 therewith whereby a voltage relation is set up in leads 77, 78 which is reproduced at the remote station within a similar stator coil having a rotor magnet inductively coupled therewith and connected to drive indicating means thereat. This system of reproducing motion is more fully set forth in copending application Ser. No. 410,343, filed September 10, 1941, now United States Patent No. 2,342,637, issued February 29, 1944, and assigned to the assignee of the present invention.

Figure 2:
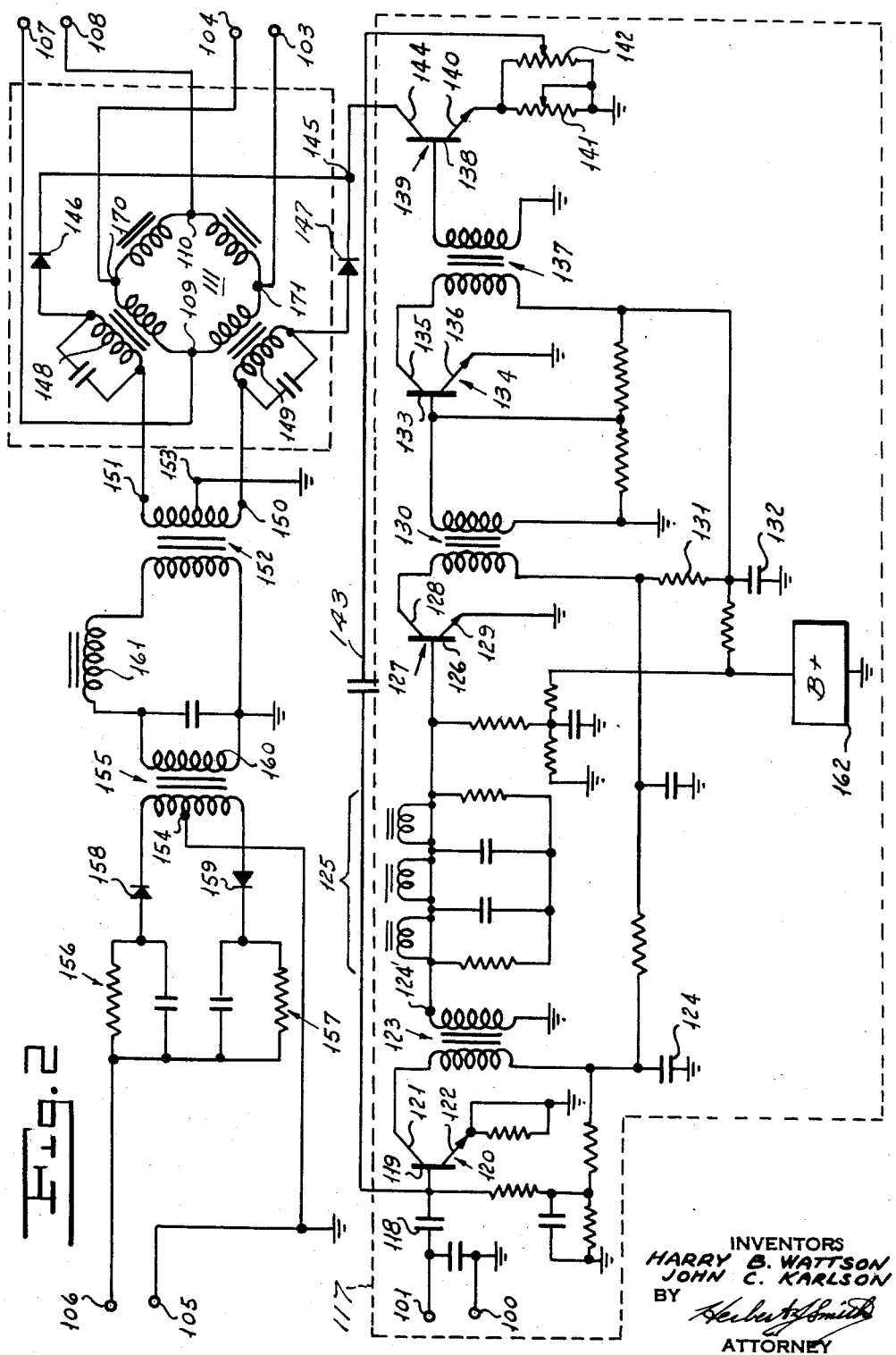
Fig. 2 is a schematic diagram of the novel amplifier of the system.

The schematic diagram as shown in Fig. 2 is that of the amplifier as represented by the block 16 in Fig. 1. The input of the amplifier 16 is fed from the rotor winding 49 via conductors 51 (Fig. 1) to the terminals 100 and 101, which terminals are shown in Fig. 2. The output terminals 103 and 104 shown on block 16 are also shown in Fig. 2. Terminals 105 and 106 shown on block 16 are connected to the alternator 30. Said terminals 105 and 106 are also connected with the conductors 107 and 108 to feed the system from the alternator 30 to terminals 109 and 110 of a bridge-type magnetic amplifier 111. The fixed phase winding 55 of the induction motor 54 is shown connected (Fig. 1) via conductors 112 and 113 to the terminals 114 and 115 of the alternator.

The amplifier 16 has therein a transistor-amplifier portion 117 for amplifying the output of the rotor winding 49 of the two-part inductive coupling device or receiver 43. The rotor winding 49 has one end thereof connected to ground with the opposite end thereof being connected to terminal 101 of the amplifier input; while the ground connection of the rotor winding 49 is connected to terminal 100. The signal input of the transistor-amplifier portion 117 is fed from terminal 101 via a capacitor 118 to the base 119 of the transistor 120 having a collector 121 and an emitter 122. The collector is connected to the primary of a transformer 123, while the opposite side of the transformer is connected via a capacitor 124 to ground. The secondary of the transformer 123 is connected to the input terminal 124' of a low-pass filter 125 with the output of the filter being connected to the base 126 of a transistor 127, which transistor has a collector 128 and an emitter 129, said emitter being connected to ground. Transistor 127 is in the second stage of the transistor amplifier and the collector of transistor 127 is connected to the primary of a transformer 130 with the opposite end of said primary being connected to ground via a resistor 131 and a capacitor 132. The secondary of transformer 130 is connected across ground and the base 133 of a transistor 134, having a collector 135 and an emitter 136, is connected to ground. The third stage including transistor 134 has the collector thereof connected to one side of the primary of transformer 137 with the opposite side thereof being connected to ground via the capacitor 132. The secondary of transformer 137 is connected from ground to the base 138 of the transistor 139, which transistor has an emitter 140 connected to ground via a network consisting of variable resistors 141 and 142. A terminal of resistor 142 is connected via conductor 143 to the base 119 of the transistor 120 to provide a feedback circuit for the transistor-amplifier portion.

The collector 144 of transistor 139 is connected to terminal 145 of the bridge-type magnetic amplifier with said terminal being connected to both of the plates of the diodes 146 and 147. The cathodes of the diodes are connected to the control windings 148 and 149, opposite ends of the said control windings being connected to terminals 151 and 150 of the secondary of the coupling transformer 152. A mid-tap terminal 153 of the secondary of the transformer 152 is connected to ground.

Terminals 105 and 106 are connected to the frequency doubler, with terminal 105 being connected to the mid-tap terminal 154 of the primary of the frequency doubler transformer 155. A pair of resistor-capacitor networks 156 and 157 each have one end thereof connected in common with terminal 106, while the opposite ends of each of said networks 156 and 157 are coupled to the primary of the frequency doubler transformer 155 via diodes 158 and 159. The secondary winding 160 of the transformer 155 has one side thereof connected to ground and the one side of the primary winding of transformer 152, while the opposite side of said secondary 160 is connected to the opposite side of the primary of transformer 152 via a choke coil 161.

The bridge-type magnetic amplifier 111, includes a discriminator for converting the alternating current to pulsating direct current and acts as a phase sensitive detector and discriminates as to the phase of the signal, which discriminator includes the diodes 146 and 147, the control windings 148 and 149, each with its respective capacitor shunted thereacross, and the secondary winding of the transformer 152.

The frequency doubler develops the frequency of the alternating current provided by the source of excitation or alternator and produces double the frequency of the source in the secondary winding 160 of the transformer 155; while the choke 161 smooths the doubled frequency output of the transformer. A source of B+ (B plus) voltage is part of the amplifier and is represented by block 162, which source is coupled by various networks of resistors and capacitors to the transistor circuits to provide suitable operating parameters for the transistor amplifier portion of the entire amplifier.

In operation, the amplified output of the rotor winding 49 provides a reversing phase signal depending on the phase of the output of rotor 49. The alternating current output of the transistor amplifier portion is of the same frequency as that provided in the transformer 152, said latter transformer providing the double frequency through the center-tap secondary thereof. The secondary of the transformer 152 provides the voltage for the discriminator via the center-tap of said secondary, so that the output of the frequency doubler and the output of the transistor portion of the amplifier, which is of the same frequency as the frequency doubler, are compared, with the alternating current being cancelled out in the bridge-type magnetic amplifier and leaving only the direct current component in either the control winding 148 or 149, depending upon the phase of the signal from the output of the transistor amplifier portion.

For example, when current flow increases in control winding 148, current will decrease in the other control winding 149. Consequently, when current increases in control winding 148, the impedance of the winding between terminals 109 and 170, decreases, and more current will flow through that particular leg of the bridge. As the current flow through control winding 149 decreases, at this particular instant, the impedance through the winding in the leg of the bridge between terminals 109 and 171 will increase, and less current will flow through that particular leg of the winding.

The magnetic amplifier and transistor combination in the bridge-type magnetic amplifier discriminator of the present invention has variations and modifications which are set forth in the co-pending application of Abbott A. Brown, Serial No. 459,488, now Patent No. 2,797,384, and in an application of John Taylor, Serial No. 487,258, for a Demodulator, filed even date herewith, the assignee of said Brown and Taylor applications being the same as the assignee of the present invention.

The alternator supplies the source of excitation through conductors 107 and 108 to terminals 109 and 110, respectively, of the four legs of the bridge circuit of the magnetic amplifier.

Depending on the phase of the direct current component, the voltage in either one of the control windings 148 or 149 will be increased, and the voltage in the other of the control windings will be decreased and the respective legs of the bridge will be affected accordingly to upset the balance in the bridge and provide a voltage in the variable phase winding 53 of the induction motor 54. The direction of rotation of the motor will be controlled by the phase of the signal produced in the bridge circuit by the unbalance in the control windings 148 and 149. The voltage for exciting the fixed phase winding 55 of the motor and the voltage in the variable phase winding of the motor are 90° apart for best operation of the motor.

From the foregoing, it will be seen that the fixed phase windings of the induction motor 54 are energized from the operating voltage lines of the alternator. Normally, the rotor and stator of the inductive coupling device or receiver are at a null position so that no output develops at the receiver rotor winding. If the resultant voltage set up in the stator winding of the receiver is not perpendicular to that of the rotor winding, an output develops at the rotor windings, this output having a phase and an amplitude corresponding to the direction and extent of displacement of the rotor winding from the perpendicular of the stator windings resultant voltage. After the output from the rotor windings is amplified by the transistor portion of the amplifier 16 and then through the discriminator portion of said amplifier, the resultant signal of the unbalanced bridge, which is fed into the variable phase winding 53 of the motor, causes rotation of the rotor shaft 57 (Fig. 1) which results in driving the rotor of the receiver to a null position, and, accordingly, to actuate the indicator to indicate the magnetic heading of the craft.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A magnetic amplifier comprising a bridge adapted to be energized by an alternating current voltage and having reactive means in two of its legs, each of said reactive means including a control winding, a source of alternating reference voltage of twice the frequency of the alternating current voltage and a source of signal voltage connected to the control windings to vary the impedance of at least one leg of the bridge to provide an alternating current output across the bridge which corresponds to the signal voltage.

2. An amplifier including a magnetic bridge adapted to be energized by an alternating current voltage and having reactive means in each of its legs, the reactive means in two of the legs including a control winding, a source of alternating reference voltage of twice the frequency of the alternating current voltage and a source of direct current signal voltage connected to the control windings to vary the impedance of at least one reactive means, depending on the polarity of the direct current signal voltage, to provide an alternating current output across the bridge which corresponds in phase and amplitude to the polarity and amplitude, respectively, of the signal voltage.

3. An amplifier for use in an inductive compass system comprising transistor amplifier means connected to a source of alternating signal voltage to provide an amplified signal, rectifying means connected to said transistor means for rectifying the amplified signal, a magnetic amplifier including a bridge adapted to be energized by an alternating current voltage and having reactive means in two of its legs, a source of alternating reference voltage having the same frequency as the voltage signal, said reactive means each including control windings connected to the source of reference voltage and to the rectifying means to vary the impedance of at least one reactive means to provide an alternating current output across the bridge which corresponds in phase and amplitude to the signal voltage.

4. A magnetic amplifier comprising a bridge adapted to be energized by an alternating current voltage and having reactive means in two of its legs, each of said reactive means including a control winding, a source of alternating reference voltage of twice the frequency of the alternating current voltage and a source of signal voltage connected to the control windings to differentially vary the impedance of the two legs to provide an alternating current output across the bridge which corresponds to the signal voltage.

5. An amplifier including a magnetic bridge adapted to be energized by an alternating current voltage and having reactive means in each of its legs, the reactive means in two of the legs including a control winding, a source of alternating reference voltage of twice the frequency of the alternating current voltage and a source of direct current signal voltage connected to the control winding to increase the impedance of one leg and decrease the impedance of the other depending on the polarity of the direct current signal voltage to provide an alternating current output across the bridge which corresponds in phase and amplitude to the polarity and amplitude, respectively, of the signal voltage.

6. An amplifier for use in an inductive compass system comprising transistor amplifier means connected to a source of alternating signal voltage to provide an amplified signal, rectifying means connected to said transistor means for rectifying the amplified signal, a magnetic amplifier including a bridge adapted to be energized by an alternating current voltage and having reactive means in two of its legs, a source of alternating reference voltage having the same frequency as the signal voltage, said reactive means each including control windings connected to the source of reference voltage and to the rectifying means to differentially vary the impedance of the reactive means to provide an alternating current output across the bridge which corresponds in phase and amplitude to the signal voltage.

7. An earth inductor compass system comprising an element responsive to the earth's magnetic field and energized from an alternating current source, a receiver connected to the element and providing error signals of twice the frequency of the source, a phase sensitive amplifier connected to said receiver and providing an output of the same frequency as the source, and a motor energized by the source and responsive to the amplifier output for driving the receiver to null position, said amplifier including rectifying means for providing a direct current voltage the amplitude of which corresponds to the signals from the receiver and a bridge adapted to be energized by the source and having reactive means in two of its legs, each of said reactive means including a control winding connected to a source of alternating reference voltage of twice the frequency of the source and the direct current voltage to vary the impedance of at least one leg of the bridge to provide an alternating output across the bridge having the same frequency as the source and corresponding in amplitude and phase to the error signals.

8. An earth inductor compass system comprising an element responsive to the earth's magnetic field and energized from an alternating current source, a receiver connected to the element and providing error signals of twice the frequency of the source, a phase sensitive amplifier connected to said receiver and providing an output of the same frequency as the source, and a motor energized by the source and responsive to the amplifier output for driving the receiver to null position, said amplifier including rectifying means for providing a direct current voltage which corresponds in amplitude to the signals from the receiver and a bridge adapted to be energized by the source and having reactive means in two of its legs, each of said reactive means including a control winding connected to a source of alternating reference voltage of twice the frequency of the source and the direct current voltage to differentially vary the impedance of the two legs to provide an alternating output across the bridge having the same frequency as the source and corresponding in amplitude and phase to the error signals.

9. An earth inductor compass system comprising an element responsive to the earth's magnetic field and energized from an alternating current source, a receiver connected to the element and providing error signals of twice the frequency of the source, a phase sensitive amplifier connected to said receiver and providing an output of the same frequency as the source, and a motor energized by the source and responsive to the amplifier output for driving the receiver to null position, said amplifier comprising a transistor amplifier means connected to the receiver for amplifying the error signals, rectifying means connected to said transistor means for rectifying the amplified error signals, a magnetic amplifier including a bridge adapted to be energized by the source and having reactive means in two legs, means for supplying an alternating reference voltage of twice the source frequency, and control windings on said reactive means connected to the reference voltage source and receiving the rectified signals to vary the impedance of at least one reactive means to provide an alternating current output across the bridge having the same frequency as the source and corresponding in phase and amplitude to the error signals.

References Cited in the file of this patent

UNITED STATES PATENTS

| | | |
|---|---|---|
| 2,261,309 | Stuart | Nov. 4, 1941 |
| 2,308,566 | Noxon | Jan. 19, 1943 |
| 2,313,682 | Stuart | Mar. 9, 1943 |
| 2,342,637 | Bechberger | Feb. 29, 1944 |
| 2,403,891 | Lamm | July 9, 1946 |
| 2,625,348 | Noxon et al. | Jan. 13, 1953 |
| 2,633,559 | Perkins et al. | Mar. 31, 1953 |
| 2,653,282 | Darling | Sept. 22, 1953 |
| 2,832,019 | Cohen | Apr. 22, 1958 |